(12) United States Patent
Eckert

(10) Patent No.: US 6,605,019 B1
(45) Date of Patent: Aug. 12, 2003

(54) SWITCHING DEVICE OF A TWO-STAGE PLANETARY GEAR

(75) Inventor: Harald Eckert, Meckenbeuren (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 09/937,642

(22) PCT Filed: Apr. 13, 2000

(86) PCT No.: PCT/EP00/03322
§ 371 (c)(1),
(2), (4) Date: Sep. 27, 2001

(87) PCT Pub. No.: WO00/63589
PCT Pub. Date: Oct. 26, 2000

(30) Foreign Application Priority Data

Apr. 19, 1999 (DE) .......................... 199 17 673

(51) Int. Cl.$^7$ ................................. F16H 3/76
(52) U.S. Cl. .................. 475/299; 475/156; 475/317
(58) Field of Search .................. 475/149, 154, 475/156, 269, 295, 298, 299, 317, 318

(56) References Cited

U.S. PATENT DOCUMENTS

| | | | | |
|---|---|---|---|---|
| 808,221 A | * | 12/1905 | Simonds | 475/154 |
| 1,498,840 A | * | 6/1924 | Hasselbring | 475/156 X |
| 2,066,952 A | * | 1/1937 | Tornebohm | 475/299 |
| 2,124,977 A | * | 7/1938 | Jensen | 475/299 X |
| 2,331,684 A | * | 10/1943 | Henningsen | 475/299 |
| 4,347,762 A | * | 9/1982 | Holdeman | 475/298 |
| 4,569,252 A | * | 2/1986 | Harper | 475/299 |
| 4,667,538 A | * | 5/1987 | Larsson | 475/299 |
| 4,938,738 A | * | 7/1990 | Fuelberth et al. | 475/317 |
| 5,390,347 A | * | 2/1995 | Buri et al. | 475/317 X |
| 5,735,767 A | | 4/1998 | Forsyth | 475/269 |
| 6,248,038 B1 | * | 6/2001 | Nilsson et al. | 475/299 X |
| 6,428,442 B1 | * | 8/2002 | Turgay et al. | 475/299 X |

FOREIGN PATENT DOCUMENTS

| | | | |
|---|---|---|---|
| DE | 134 156 | 7/1933 | |
| DE | 928 214 | 5/1955 | |
| DE | 1 122 143 | 1/1962 | |
| DE | 33 668 | 12/1964 | |
| DE | 32 43 431 A1 | 5/1984 | F16D/27/10 |
| DE | 91 00 932.4 | 5/1991 | F16H/3/52 |
| DE | 196 28 642 C2 | 9/1998 | F16H/63/30 |
| EP | 0 132 923 A2 | 1/1985 | F16H/3/54 |

* cited by examiner

Primary Examiner—Charles A Marmor
Assistant Examiner—Ha Ho
(74) Attorney, Agent, or Firm—Davis & Bujold, P.L.L.C.

(57) ABSTRACT

A two-stage planetary gear drive,-shifting device having an input shaft (1) which is connected with a sun gear (12) and an output shaft (2) which is connected to a planetary gear carrier (15), hollow internal gear (18), of the planetary gear drive, is form-fit, by a slide collar (19), to either a gear drive housing (3) or is coupled to the gear (12). The slide collar (19), is coaxial with the input drive shaft and is slidable into various shift positions by an electrical positioning member (31). It is proposed that the electrical positioning member (31) is an electromagnet, and an armature (33) of the electromagnet is connected, in a driving manner, with the slide collar (19).

22 Claims, 1 Drawing Sheet

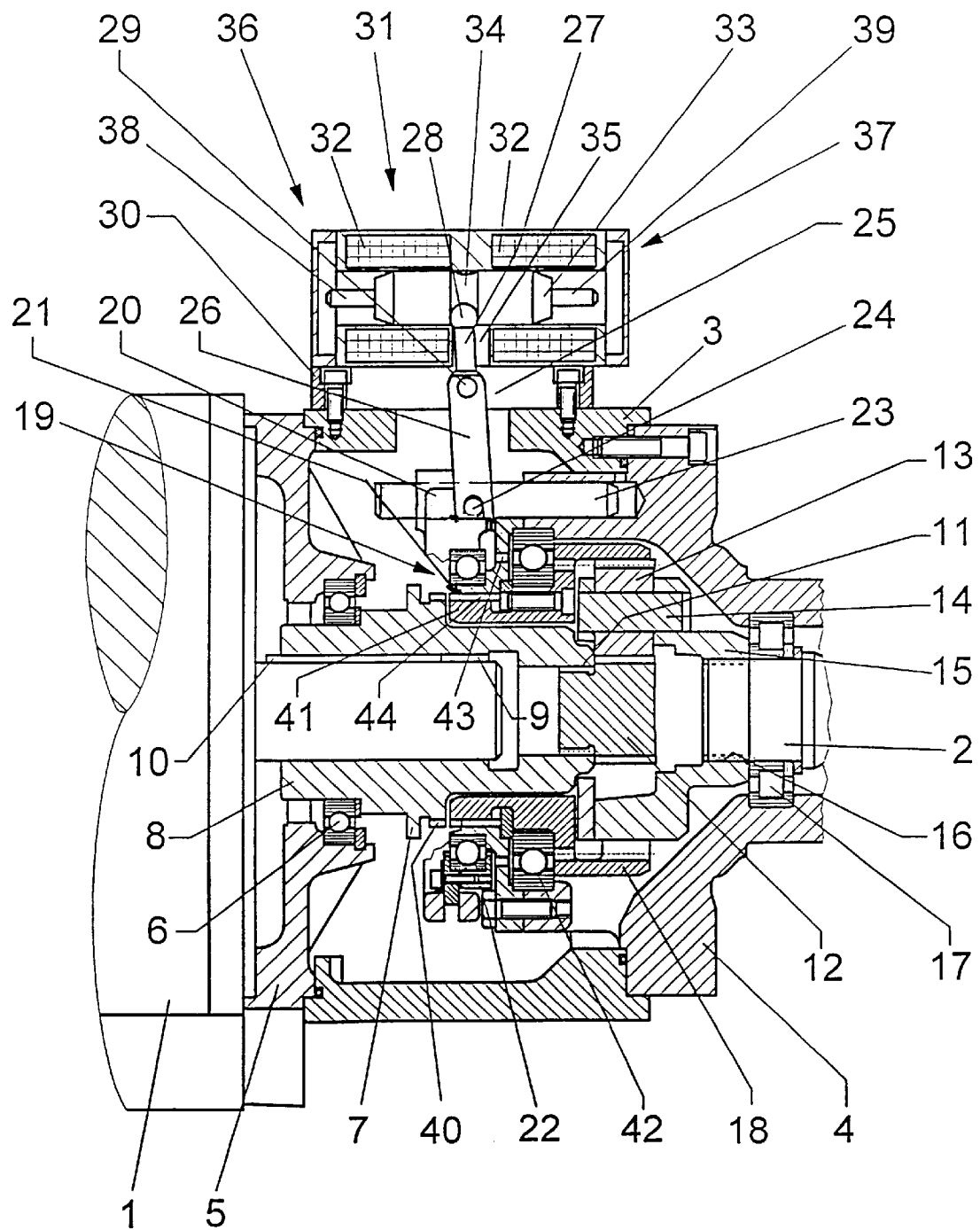

SWITCHING DEVICE OF A TWO-STAGE PLANETARY GEAR

FIELD OF THE INVENTION

The invention concerns a switching device of a two stage planetary gear.

BACKGROUND OF THE INVENTION

A basic, generic form of shifting devices was made known) from the operating specification 4161 758 002b for two-stage shifting devices for "AC and DC Main Spindle Drive, 2K10, 2K12, 2K15, 2K20" of the ZF Maschinenantribe, GmbH, February, 1994. The gear drive has been mainly used in tool machine drives for turning, milling, and machining centered Industries. DC/AC-main spindle motors serve as primary driving means. The gearing sets increase the band width of application of the main spindle motors by increasing the flexibility of the tool machines in the working of various starting materials, that is, by increasing cutting power through high torques or speeds of rotation. The two ratio change stages are formed, in that first, the input shaft, which is connected to a sun gear, is also coupled to a hollow internal gear and second, the said hollow gear is coupled with the housing. A planetary gear carrier is attached to the output shaft.

A sliding collar serves as an axially movable connection piece between the internal gear and the sun gear, which is to say, between the internal gear and the housing. This said collar is connected by means of a forked switching member with an electrical limit switch unit. This encompasses a helical drive land a slip clutch and is driven by a direct current motor, which is placed axis-parallel to the input shaft and extends at the end above the gear drive housing. The helical drive converts the rotating motion to a vertical movable shifting shaft, which by means of a pinion and toothed bar, converts the rotating motion into a linear movement. This is transmitted over a shifting element to the sliding collar. For the recognition of end-positions, two limit switches serve In the circuit unit, which must be installed in the wiring, together with the end position detent. The shifting equipment is complex and expensive and It Is difficult to adjust this to match spatial and drive aspects of application requirements.

Further, from DE 196 28 642 C2, an electro-mechanical shifting mechanism for change of gear transmissions for motor vehicles is made known, wherein an armature of an electromagnet acts upon a slide collar by means of a shifting disk serving as a linkage lever. The shifting disk can be placed in several shifting positions by means of a locking magnet. The activation rod of the armature can also coact directly on a fork of the slide collar.

From DD 33 668, especially for motor vehicles, there is made known an electromechanically controlled shifting apparatus for gear change transmissions. Two springs center a gear shifting member into its middle position by means of two armatures of two electromagnets. By appropriate, varying control of the electromagnets, two other shift lanes can be preselected and positioned. Since the electromagnets, when in the switched-on condition, work against two springs, the current demand in the ON-condition is substantial and the efficiency is not satisfactory.

Thus the invention has the purpose, of creating a simple shifting apparatus, which, without great expense can be adapted to various applications and operational conditions.

SUMMARY OF THE INVENTION

In accord with the invention, the positioning member is an electromagnet, the armature of which is driveably connected to a slide collar. Since the electromagnet, in comparison to a helical gear drive, possesses no inherent friction, it is advantageous that the electromagnet does possess detent means, which lock the armature in the shifting positions. These detent elements can be spring loaded ball elements. In order to increase the security, it is of advantage however, if locking magnets be employed as detent elements, by means of which, a form-fit secured position can be obtained.

The electromagnet is advantageously installed on the periphery of the gear drive housing, axis-parallel to the input shaft and to the direction of shifting. Its length should not extend beyond the housing of the narrowly built planetary gear arrangement, so that the gear drive can be conflict with electromotors of different diameters which, in some cases can extend beyond the cross-sectional contour of the gear drive housing. Further, with an electromagnet, short shifting times can be obtained.

In accord with an embodiment, between the electromagnet and the slide collar, a two-armed lever is provided, which is pivotally fastened in mid-section to the gear drive housing and is connected by one arm to the armature and with the other arm on the slide collar. By means of different lever arms, the shifting force and the shifting path can be modified. When this is done, it is advantageous, to place an adapter piece between the gear drive housing and the electromagnet, in which the lever is secured. Thereby, the range of variation of the lever relationships can be clearly increased.

In order to reduce the friction between the lever and the slide collar, it becomes necessary that the said slide collar has an outer and an inner part. The outer part is affixed by a an axial guide bolt to resist turning, and is guided axially to slide on the gear drive housing and provided with a roller bearing to be pivotally secured on the inner part. Thus there exists between the lever and the outer part of the slide collar no rotational movement between them, which could act upon the shifting force. The inner part, which is compelled to execute the axial movement, possesses an outer coupling toothing for coupling onto the gear drive housing and an inner toothing for a driveable connection with the sun gear.

Since the electromagnet is inclusive of a limit detent, the end limit switch can be dispensed with and need not be installed again. By means of these measures, improper positioning and possibilities of error on the part of the end user are avoided. For security, it is, however of advantage, to provide an end limit switch to monitor the shift position and the shift functioning, although these need not be adjusted.

BRIEF DESCRIPTION OF THE DRAWING

Further advantages are more obvious in the following description based on the drawing. In the drawing is presented an embodiment example of the invention. The description and the claims contain a multitude of features in combination. The expert can advantageously examine the individual features which can be brought together in further combinations.

The single FIG. 1/1 shows a partial longitudinal section through a two stage planet gear with a shifting device in accord with the invention.

DETAILED DESCRIPTION OF THE INVENTION

The two stage planetary gear possesses an input shaft 1 and an output shaft 2, which are placed within bearing coverings 4 and 5 of a gear drive housing 3 and borne in roller bearings 6, 17. To the planetary gear belongs a sun gear 12 which is in a drive connection with the input shaft 1. The sun gear 12 meshes with the planet gears 13. These are supported by planetary bolts 14 in a planet gear carrier 16, which, has a form-fit binding 16 with the output shaft 2. The a roller bearing 42 in the housing 3 and is form-fit as well as rotatably bound to a coupling element 41. The coupling element 41, by means of an externally toothed coupling 44, non-rotatably connected with an inner component of slide collar 19. An outer part 20 of a slide collar 19 is supported on this coupling element 41 by means of a roller bearing 22. The outer part 20 is axially slidable relative to the gear drive housing 3, by guidance of a bearing bolt 23, whereby the axial sliding of the said outer part 20 is transferred to the inner part 21 by means of the roller bearing 22.

The slide collar 19 can assume three shift positions. These positions are a neutral position, a first shift position, in which the internal gear 18, by a coupling toothing 43 is attached to the housing 3, and a second shift position, in which the said slide collar 19 couples the internal gear 18 to the sun gear 12 by means of a coupling component 8 with a come-along toothing 40 and a form-fit connection 11. A detent 7 on the coupling component 8 limits the axial slide movement of the slide 19.

The coupling component 8 is non-rotatably connected with the input shaft 1 by means of a groove 9 and a spring 10. On the outer part 20 of the slide collar 19 is linked a lever 25, in which a forked end of an inner arm 26 of said lever 25 encompasses a transverse pin 24, which is provided in the outer part 20. The lever 25 is, of itself, supported by a bearing bolt 29, which is placed in an adapter piece 30 between the gear drive housing 3 and an electromagnet 31.

The electromagnet 31 is axis-parallel to the input shaft 1 and is secured on the circumference of the gear drive housing 3 above the adaption piece 30. It possesses magnet coils 32, which surround an armature 33, which, according to the polarity and amount of current applied to the magnet coils 321 is axially displaced and held, in the shift position by means of retaining elements, not further described, for instance, spring loaded ball detents or more advantageously, by form-fit locking magnets. The armature 33 possesses on its end surfaces armature pins 38, 39 which, coact with the limit switches 36, 37, and monitor the shifting position, and thereby the function of the shifting apparatus. In the case of error detection, by means not more closely described here, an alarm is emitted and/or the machine is stopped.

A second arm 27 of the lever 25 is connected in a driving way with the armature 33, in which said arm extends itself with a rounded head 28 through an opening 35 of the magnet coil 32 into a transverse boring 34 of the armature 33.

REFERENCE NUMERALS 1 input power shaft
2 output power shaft
3 gear drive housing
4 bearing cover
5 bearing cover
6 roller (or ball) bearing
7 detent
8 coupling part
9 groove
10 spring
11 form-fit connection
12 sun gear
13 planet gear
14 planet bolt
15 planet gear carrier
16 form-fit connection
17 roller (or ball) bearing
18 hollow internal gear
19 slide collar
20 outer part of slide collar
21 inner part of slide collar
22 roller (or ball) bearing
23 holding bolt
24 transverse rod
25 lever
26 arm of lever
27 arm of lever link
28 ball shaped head
29 holding bolt
30 adaption piece
31 electromagnet
32 magnet coil
33 armature
34 transverse boring (armature)
35 opening for 27
36 limit switch
37 limit switch
38 armature pin
39 armature pin
40 come-along toothing
41 coupling component
42 roller (or ball) bearing
43 coupling toothing
44 coupling toothing

What is claimed is:

1. A two stage planetary gear shifting device having a sun gear, a planetary carrier (15) supporting a plurality of planetary gears (13), and a hollow internal ring gear (18), the sun gear (12) being connected to an input shaft (1) and the planetary carrier (15) being connected to an output shaft (2) to supply output drive thereto, and the hollow internal ring gear (18) being engageable, via a slide collar (19), with one of a gear drive housing (3) for the shifting device and the sun gear (12), and the slide collar (19) is coaxially slidable, with respect to the input shaft (1), into a plurality of shift positions by an electrical positioning member (31);

wherein the positioning member (31) is an electromagnet, the electromagnet (31) has an armature (33) which is drivingly connected with the slide collar (19), the sliding collar comprises an outer part (20) and the inner part (21) with a bearing (22) located between the outer part (20) and the inner part (21), and the electromagnet (31) has a retaining element which retains the armature (33) in a desired one of the plurality of shift positions.

2. The shifting device according to claim 1, wherein the retaining element is a locking magnet.

3. The shifting device according to claim 1, wherein the electromagnet (31) is located about a circumference of the gear drive housing (3) and within an axial length of the gear drive housing (3), and the electromagnet (31) extends along an axis extending parallel to an axis defined by the input shaft (1).

4. The shifting device according to claim 1, wherein a pivoting lever (25) couples the electromagnet (31) to the slide collar (19), and the pivoting lever (25) has one end (27) linked to the armature (33) and an opposite end (26) linked to the slide collar (19).

5. The shifting device according to claim 4, wherein the outer part (20) of the slide collar (19) is non-rotatably secured to the gear drive housing (3), by a bearing axial bolt (23), which allows axial movement of the slide collar (19) but prevent rotation of the outer part (20) of the slide collar (19).

6. The shifting device according to claim 4, wherein an adapter piece (30), to which the pivot lever (25) is supported, is located between the gear drive housing (3) and the electromagnet (31).

7. The shifting device according to claim 4, wherein the armature (33) of the electromagnet (31) has a transverse bore (34) into which a round head (28), provided on one end (27) of the pivot lever (25), engages.

8. The shifting device according to claim 1, wherein the plurality of shift positions of the slide collar (19) are monitored by a position sensitive switch.

9. The shifting device according to claim 7, wherein a second opposed end of the pivot lever (25) has a slot for engaging with a pin (24) which facilitate axial movement of the slide collar (19).

10. The shifting device according to claim 9, wherein the engagement between the slot and the pin (24) facilitate pivoting of the pivot lever (25) relative the slide collar (19).

11. The shifting device according to claim 7, wherein the pivot lever(25) is pivotally connected to the gear drive housing (3) via a bearing bolt (29) to facilitate pivoting of the pivot lever (25) and actuation of the plurality of shift positions.

12. A two stage planetary gear shifting device having a sun gear, a planetary carrier (15) supporting a plurality of planetary gears (13), and a hollow internal ring gear (18), the sun gear (12) being connected to an input shaft (1) and the planetary. carrier (15) being connected to an output shaft (2) to supply output drive thereto, and the hollow internal ring gear (18) being engageable, via a slide collar (19),with one of a gear drive housing (3) for the shifting device and the sun gear (12), and the slide collar (19) is coaxially slidable,with respect to the input shaft (1), into a plurality of shift positions by an electrical positioning member (31);

wherein the positioning member (31) is, an electromagnet, the electromagnet (31) has an armature (33) which is drivingly connected with the slide collar (19), the electromagnet (31) has a retaining element which retains the armature (33) in a desired one of the plurality of shift positions, and a pivoting lever (25) couples the electromagnet (31) to the slide collar (19), and the pivoting lever(25) has one end (27) linked to the armature (33) and an opposite end (26) linked to the slide collar(19).

13. The shifting device according to claim 12, wherein the retaining element is a locking magnet.

14. The shifting device according to claim 12, wherein the electromagnet (31) is located about a circumference of the gear drive housing (3) and within an axial length of the gear drive housing (3), and the electromagnet (31) extends along an axis extending parallel to an axis defined by the input shaft (1).

15. The shifting device according to claim 12, wherein the outer part (20) of the slide collar (19) is non-rotatably secured to the gear drive housing (3), by a bearing axial bolt (29), which allows axial movement of the slide collar (19) but prevent rotation of the outer part (20) of the slide collar (19).

16. The shifting device according to claim 12, wherein an adapter piece (30), to which the pivot lever (25) is supported, is located between the gear drive housing (3) and the electromagnet (31).

17. The shifting device according to claim 29, wherein the armature (33) of the electromagnet (31) has a transverse bore (34) into which a round head (28), provided on one end (27) of the pivot lever (25), engages.

18. The shifting device according to claim 12, wherein the plurality of shift positions of the slide collar (19) are monitored by a position sensitive switch.

19. The shifting device according to claim 17, wherein a opposed end of the pivot lever (25) has a slot for engaging with a pin (24) which facilitate axial movement of the slide collar (19).

20. The shifting device according to claim 19, wherein the engagement between the slot and the pin (24) facilitate pivoting lever (25) relative the slide collar (19).

21. The shifting device according to claim 17, wherein the pivot lever (25) is pivotally connected to the gear drive housing (3) via a bearing bolt (29) to facilitate pivoting of the pivot lever (25) and actuation of the plurality of shift positions.

22. A two stage planetary gear shifting device having a sun gear, a planetary carrier (15) supporting a plurality of planetary gears (13), and a hollow internal ring gear (18), the sun gear (12) being connected to an input shaft (1) and the planetary carrier (15) being connected to an output shaft (2) to supply output drive thereto; and the hollow internal ring gear (18) being engageable, via a slide collar (19), with one of a gear drive housing (3) for the shifting device and the sun gear (12), and the slide collar (19) is coaxially slidable, with respect to the input shaft (1), into a plurality of shift positions by an electrical positioning member (31);

wherein the positioning member (31) is an electromagnet, the electromagnet (31) has an armature (33) which is drivingly connected with the slide collar (19), the sliding collar comprises an outer part (20) and an inner part (21) with a bearing (22) located between the outer part (20) and the inner part (21), the electromagnet (31) has a retaining element which retains the armature (33) in a desired one of the plurality of shift positions, and the outer part (20) of the slide collar (19) is non-rotatably secured to the gear drive housing (3), by a bearing axial bolt (23), which allows axial movement of the slide collar (19) but prevent rotation of the outer part (20) of the slide collar (19).

* * * * *